Nov. 18, 1958 W. P. OEHLER ET AL 2,860,470

DISK HARROW

Original Filed Aug. 2, 1951

INVENTORS.
WILLIAM P. OEHLER
CHARLES H. YOUNGBERG
BY

ATTORNEYS

United States Patent Office 2,860,470
Patented Nov. 18, 1958

2,860,470

DISK HARROW

William P. Oehler and Charles H. Youngberg, Moline, Ill., assignors, by mesne assignments, to Deere & Company, a corporation of Delaware Original application August 2, 1951, Serial No. 239,922, now Patent No. 2,765,610, dated October 9, 1956. Divided and this application March 12, 1956, Serial No. 570,748

11 Claims. (Cl. 55—73)

The present invention relates generally to agricultural implements and more particularly to ground-working implements, such as disk harrows and the like, and this application is a division of our copending application, Serial No. 239,922, filed August 2, 1951 for Disk Harrow, now U. S. Patent 2,765,610, issued October 9, 1956.

The object and general nature of the present invention is the provision of a new and improved disk harrow which is particularly constructed and arranged for connection to a farm tractor. More specifically, it is a feature of this invention to provide a disk harrow that includes front and rear gangs and a hitch device of the type that is adapted to be connected in trailing relation with the rear end of a tractor and which carries or is provided with generally vertically swingable ground wheels supporting the rear portion of the hitch device and the associated disk gangs. Further, it is a feature of this invention to provide attachment means by which the harrow may readily be connected and disconnected from the ground wheel supported hitch device. It is also a feature of this invention to provide a disk harrow structure of this kind, in which the ground wheels may be operated to bodily raise and lower the disk gangs into and out of transport and operating positions.

These and other objects and advantages of the present invention will be apparent to those skilled in the art after a consideration of the following detailed description, taken in conjunction with the accompanying drawings, in which.

Figure 1:
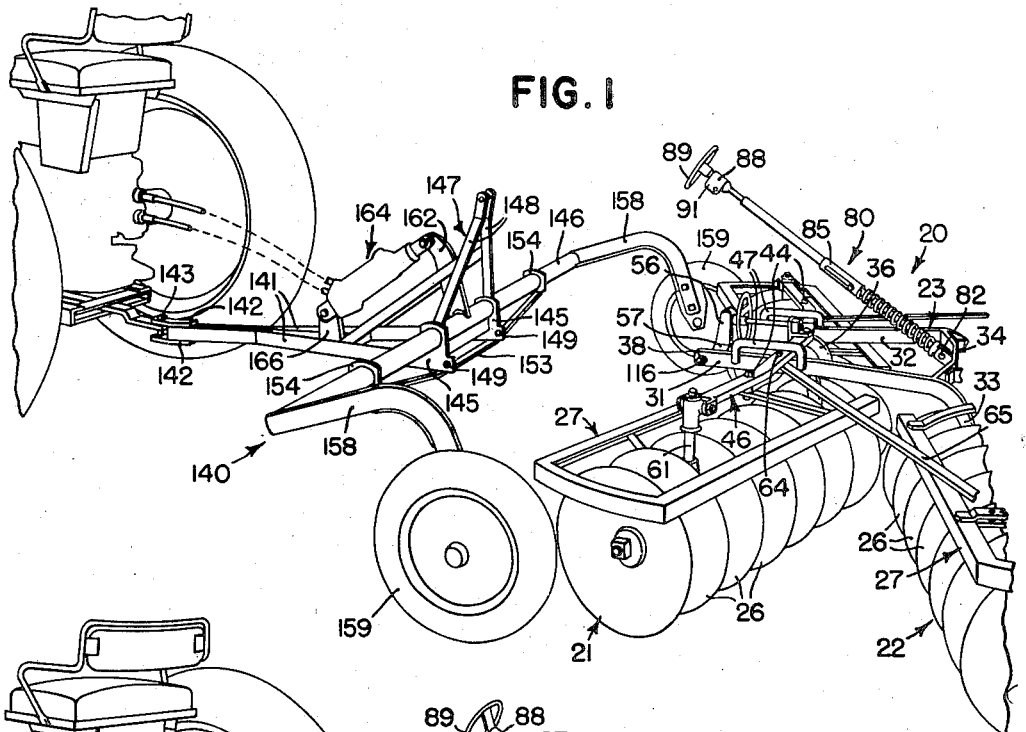
Figure 1 is a perspective view of our improved disk harrow, showing the wheel-supported hitch frame in a manner in which the disk gangs are detachably connectible to the frame.

Referring now to the drawings, the disk harrow gangs and associated frame means will first be described, followed by a description of the ground supported hitch means and associated power lift actuated connections with which the harrow of the present invention is particularly adapted to cooperate.

The disk gangs and associated parts are indicated as an entirety by the reference numeral 20 and, as shown, comprises a pair of front gangs 21 and a pair of rear gangs 22 pivotally connected at their laterally inner ends to a main harrow frame 23. The gangs 21 and 22 are per se of generally conventional construction, comprising essentially a gang of disks 26 interconnected together by a suitable gang bolt and spacing sleeves, each gang having suitable bearings by which an associated gang frame 27 is supported on the gang.

The main harrow frame 23 comprises a pair of laterally spaced apart, generally fore-and-aft extending frame bars 31 and 32, the rear portions of which are bent downwardly to form downwardly extending, gang-receiving standards 33. The rear end portions of the frame bars 31 and 32 are rigidly connected together by a crossbar 34, secured as by welding to the rear portions of the frame bars 31 and 32 just forward of the downwardly extending standard sections 33. The rearward portions of the frame bars 31 and 32 are arranged in rearwardly diverging relation while the forward portions extend generally in parallelism. Secured, as by welding, to the rear portions of the parallel sections are front standard members 36, the lower ends of which extend into the upwardly extending sockets of the bearings at the laterally inner ends of the front gangs 21. The bearings at the laterally inner ends of the rear gangs 22 are of like or similar construction, these bearings and associated parts being substantially like that shown in U. S. Patent No. 2,644,388, issued July 7, 1953. The forward ends of the parallel frame bar sections are apertured, as at 38, forming attachment means by which the front portion of the frame 23 may be connected to a hitch device or the like.

Secured to the forward portion of the frame bars 31 and 32 is a crossbar 41, preferably welded to the bars 31 and 32. The crossbar 41 extends laterally outwardly beyond the frame 23, forming outrigger arms, the end portions of which are apertured to receive vertical pivot members 44. Mounted on each of the laterally outwardly extending bar sections or outrigger arms is a transversely disposed lever 46, the intermediate portion of which is apertured to receive the pivot member 44. The laterally inner end portion of each of the two levers 46 passes under a yoke 47 which is secured rigidly, as by welding, to the associated frame bar with sufficient space to accommodate the inner end portion of the lever while preventing any upward displacement of the inner end of the lever. The inner ends of the levers 46 overlap and are apertured to receive a common pivot member 49 by which the two levers are connected to swing together about the vertical axes defined by the pivot member 44. A yoke member 51 embraces the overlapping ends of the levers 44 and is apertured to receive the pivot member 49. The apertures in the overlapping end portions of the levers 46 are slotted to accommodate the swinging of the levers 46 about pivots 44 and the fore-and-aft movement of the pivot 49 and yoke 51. The yoke member 51 is also provided with an upwardly disposed, internally threaded boss into which the threaded end of a fore-and-aft extending adjusting member 53 is received. The forward end of the screw-threaded member 53 carries a hand wheel 54, by which the member 53 may be turned when desired, and the forward end of the screw-threaded member 53 is rotatably received in an abutment block or bracket 56 secured, as by welding, to a cross member 57 which rigidly interconnects the forward ends of the main frame bars 31 and 32.

The outer end of each of the levers 46 carries a bifurcated or yoke section 57' which is connected by a swivel bolt 58 to the upper end of a vertical sleeve section 59 in which a vertical standard 61 is slidably disposed. The lower end of the standard 61 is connected with the outer bearing member of the associated front gang by bearing means substantially like that shown in the above mentioned patent. A stop 62 is fixed to the upper end of the standard 61, above the sleeve 59, and serves thereby as a limit preventing the outer end of the associated gang from moving downwardly relative to the outer end of the associated lever 46, but the outer end of the gang may move upwardly a limited distance. Each lever arm 46 has its laterally inner end portion connected, as at 64, with the laterally outer portion of the associated rear gang 22 by means of a rearwardly and laterally outwardly extending link 65, the forward end of which is pivotally connected with the associated lever 46, inwardly of the pivot 44, and its laterally outer or rear end is pivotally connected, as by a pin 66 or the like, with the laterally outer portion of the associated rear gang, preferably through a fore-and-aft extending apertured member 67. By placing the pivot 66 in any selected one of the apertures in the member 67, the angular relation between the rear gang and the associated front gang may be varied as desired. The vertical swinging of each of the rear gangs relative to the main frame 23 is restrained by a spring device 69 that includes a rod member 71 pivoted to a crossbar 72 that forms a part of the rear gang frame 27, the rod 71 extending slidably through a bracket 73 carried by the rear crossbar 34. Compression springs are disposed on opposite sides of the associated bracket 73 and lock nuts provide adjusting means by which the effective tension exerted by the springs may be varied, as desired. Preferably, the parts are so adjusted that the rear gangs are normally held in a level position but some vertical flexibility is provided. However, the flexibility is of limited extent so that when the main frame 23 is raised, as will be referred to below, the rear gangs are held by the spring devices 69 out of contact with the ground.

For leveling the harrow in a generally fore-and-aft direction, we provide an adjusting strut member, indicated in its entirety by the reference numeral 80. This member comprises a lower rod member 81 pivotally connected, as at 82, to the central portion of the rear crossbar 34 of the main frame 23 and encircled by a compression spring 83 the upper end of which bears against the lower end of a sleeve member 85 within which the rod member 81 telescopes. The rod member 81 carries a pin working in a slot in the sleeve member 85 to prevent disconnection of the rod and sleeve. Details of the adjusting strut 80 are shown in our U. S. Patent No. 2,704,018. The upper end of the sleeve member 85 carries a nut member in which the lower threaded end of a short shaft 87 is received. The shaft 87 is held against axial displacement in a tubular member 88, and a hand wheel 89 is fixed, as by welding, to the outer or forward end of the threaded shaft 87. The upper tubular member 88 carries a transversely apertured boss section 91 and forms an upper attachment means cooperating with lower attachment means formed by the forward apertured portions of the frame bars 31 and 32 mentioned above. The upper and lower attachment means are adapted to be connected to an associated wheel-supported hitch frame means that, as a matter of fact, forms a portion of the disk harrow implement as a whole. Such a hitch frame provides for connecting the disk harrow gangs in trailing relation to be towed by a tractor in the conventional manner, whereby the harrow may be connected to practically any farm tractor, especially those having a power unit which includes a remote hydraulic ram unit, the latter being adapted to operate or control the ground wheels of the hitch frame.

In order to accommodate the connection of the disk gang and associated parts of the disk harrow of the present invention to a conventional farm tractor, we provide a hitch frame 140 that includes a pair of generally fore-and-aft extending, forwardly converging bars 141, the forward ends of which are provided with upper and lower apertured plates 142 welded or otherwise secured to the forward ends of the bars 141. The plates may be connected by a hitch pin 143 to the drawbar of a conventional tractor. The rear portions of the frame bars 141 are provided with apertured lugs 145 in which a transversely extending wheel shaft 146 is rockably mounted. The lugs 145 are extended upwardly, forming a vertical hitch structure 147, including a pair of upwardly converging bars 148, the uppermost ends of which are apertured to receive a pin by which the tubular bushing 88 of the strut member 80 may be connected thereto. The rear ends of the frame bars 141 are apertured, as at 149, thereby forming laterally spaced apart means for receiving the forward apertured ends of the disk harrow frame bars 31 and 32. The rear portions of the hitch frame bars 141 are reenforced by a crossbar 153, the outer ends of which extend laterally outwardly beyond the frame bars 141 and carry apertured lugs 154 aiding in the support of the wheel shaft 146. The latter member carries crank arms 158, one at each end thereof, and the lower end of each crossbar 148 carries a stub axle on which a ground wheel 159 is journaled. The central portion of the wheel shaft 146 carries an arm 162 rigid therewith, and the upper end of the arm 162 is provided with an apertured section by which the rear end of a hydraulic ram unit 164 may be connected to swing the shaft 146. The forward end of the ram unit may be releasably connected with the frame bars 141 in any suitable manner, as by a bracket 166.

Figure 2:
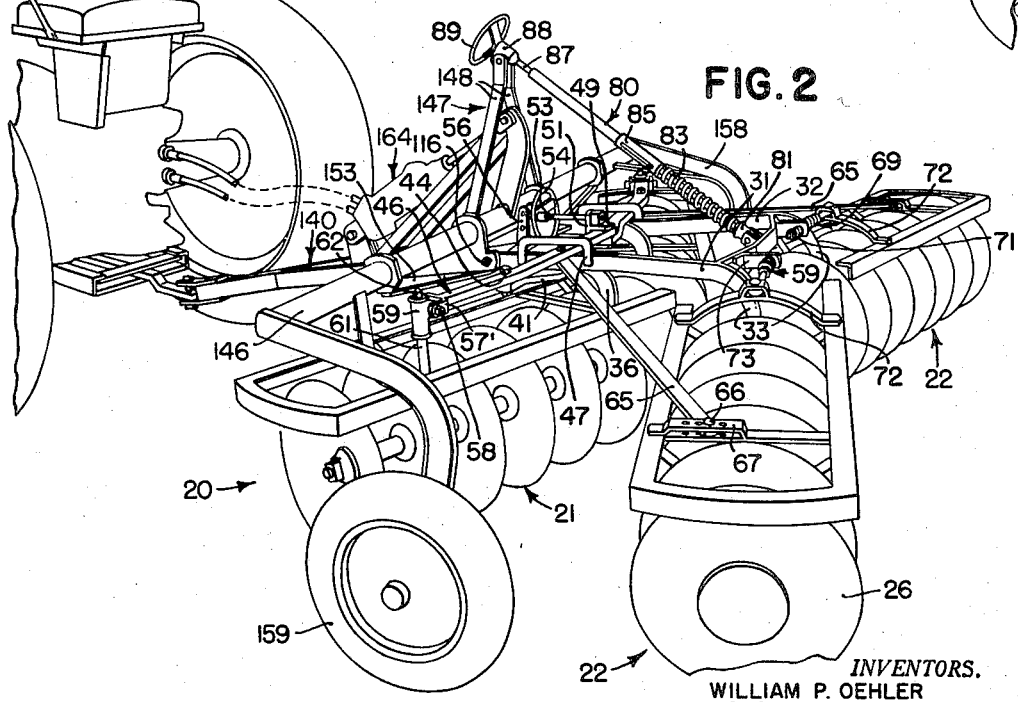
Figure 2 is a view similar to Figure 1, showing the disk harrow completed by the attachment of the gangs units to the wheel-supported hitch frame.

As will be seen from Figure 2, considered broadly, the harrow frame 23 and the hitch frame 140, taken together, constitute generally rigid frame means that, when interconnected by the strut 80, carries the rigid transverse crossbar member 153, the latter extending generally over the front gangs.

By backing the wheel frame 140 into a position at the front of the harrow, the lower attachment means and the associated pivots 116 may be connected with the rear ends 149 of the bars 141. At the same time, the tubular bushing 88 at the forward end of the adjusting strut member 80 may be connected to the upper ends of the bars 148, whereupon the harrow is connected to be bodily raised and lowered with the wheel frame 140. The raising and lowering of the latter is effected by operating the power lift ram unit 164 to raise and lower the wheels 159. The wheel shaft 146 is of such length that the wheels 159 are disposed laterally outwardly a short distance of the outer ends of the front gangs, but the rear gangs are of such lengths that the distance between the outer ends of the rear gangs is greater than the distance between the wheels 159, whereby the laterally outermost disks 26 obliterate any wheel tracks formed by the wheels 159. Since the wheel frame 140 is connected by a single hitch pin to the tractor, the harrow and wheel frame combination as just described may be connected in towed or trailing relation to practically any farm tractor having a rear drawbar.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A disk harrow comprising a main frame, front and rear pairs of disk gangs connected therewith, the distance between the outer ends of the front gangs being less than the distance between the outer ends of the rear gangs, an adjustable strut member pivotally connected at its rear portion with the rear portion of said main frame, a hitch device having lower laterally spaced attachment means adapted to receive the forward portion of said main frame and an upper section adapted to receive the forward portion of said strut member, and a wheel frame pivotally connected with said hitch device and including a pair of ground engaging means spaced apart laterally farther than the distance between the outer ends of said front gangs and less than the distance between the outer ends of the rear gangs.

2. A disk harrow comprising a main frame, disk gangs connected therewith, an adjustable strut member pivotally connected at its rear portion with the rear portion of said main frame, a hitch device having lower laterally spaced attachment means adapted to receive the forward portion of said main frame and an upper section adapted to receive the forward portion of said strut member, and a wheel frame pivotally connected with said hitch device and including ground engaging means disposed generally between certain of said disk gangs, said hitch device including a cross bar, a vertical section fixed at its lower end to the intermediate portion of said cross bar, the latter carrying said lower attachment means, and means connected with said cross bar for swingably receiving said wheel frame.

3. A disk harrow comprising a main frame, disk gangs pivotally connected at their laterally inner ends to said frame, means movably carried by said frame and operatively connected with the laterally outer ends of said gangs for changing the positions thereof relative to said frame, an adjustable strut member pivotally connected at its rear portion with the rear portion of said main frame, a hitch device having lower laterally spaced attachment means adapted to pivotally receive the forward portion of said main frame and an upper section adapted to pivotally receive the forward portion of said strut member, said hitch device including a hitch frame attachable at its forward end to a tractor in trailing relation, and crank axle means rockably connected with said hitch frame and including two laterally spaced apart generally swingable crank sections, each having a ground wheel journaled on the swinging end thereof.

4. A disk harrow comprising a main frame, disk gangs pivotally connected at their laterally inner ends to said frame, means movably carried by said frame and operatively connected with the laterally outer ends of said gangs for changing the positions thereof relative to said frame, an adjustable strut member pivotally connected at its rear portion with the rear portion of said main frame, a hitch device having lower laterally spaced attachment means adapted to pivotally receive the forward portion of said main frame and an upper section adapted to pivotally receive the forward portion of said strut member, said hitch device including a hitch frame attachable at its forward end to a tractor in trailing relation, and crank axle means rockably connected with said hitch frame and including two laterally spaced apart generally swingable crank sections, each having a ground wheel journaled on the swinging end thereof.

5. A disk harrow comprising a rigid frame means, a plurality of gangs flexibly connected at their inner ends with said frame means, generally vertically movable ground wheels disposed between said gangs, a generally transverse rigid member carried by said frame means generally over one pair of said gangs and extending laterally outwardly of said rigid frame means, a wheel structure rockably mounted on said transverse rigid member and carrying said ground wheels, means connected to act between said frame means and said rockable wheel structure to raise and lower the wheels relative thereto so as to lower and raise said frame means and disk gangs relative to the ground, and means supporting the outer ends of said gangs from said frame means when said ground wheels are lowered a distance sufficient to raise said gangs off the ground, said supporting means comprising a connection individual to each gang and connecting each gang, independently of the other gangs, with said rigid frame, said individual connections being constructed and arranged to provide for floating movement of said gangs relative to the frame when the latter is lowered and said wheels are raised.

6. A disk harrow comprising a generally fore-and-aft extending rigid frame means, pairs of front and rear gangs connected at their inner end portions with said frame means at points spaced apart in a fore-and-aft direction on the frame means, for generally vertical swinging relative to the frame means, a transverse structure carried by the forward portion of said rigid frame means, a wheel frame swingably connected with said transverse structure and including a transverse member rockably mounted on said transverse structure and crank arms fixed to the ends of said transverse member and extending downwardly and rearwardly to points between the front and rear gangs, ground wheels on said arms, an upstanding arm connected at its lower portion to the generally central portion of said transverse member, an extension connected in substantially vertical relation with said rigid frame means, a ram unit operatively connected between said extension forward of said rockable transverse member and said arm for raising and lowering said wheels relative to said rigid frame means, and means supporting the outer ends of said gangs from said rigid frame means when said ground wheels are lowered a distance sufficient to raise said gangs off the ground, said supporting means comprising a connection individual to each gang and connecting each gang, independently of the other gangs, with said rigid frame means.

7. A disk harrow comprising a generally fore-and-aft extending main frame, front and rear gangs connected with said frame for fore-and-aft angular adjustment, a hitch device pivotally connected with the forward end of said frame and including an upwardly extending rigid section, an adjustable strut member connected between the upper end portion of said upwardly extending section and the rear end of said frame, transversely spaced apart attaching sections carrier by said hitch device, means on the forward portion of said main frame pivotally connecting the latter with said attaching sections, a generally transverse rigid member carried by said hitch device and extending laterally outwardly of said rigid frame means, generally vertically movable ground wheels disposed between said gangs, a rockable member mounted on said transverse rigid member and carrying said ground wheels, and means carried by said hitch device for rocking said wheel carrying member.

8. A disk harrow comprising a main frame, disk gangs connected at their laterally inner ends to said frame, an adjustable strut member pivotally connected at its rear portion with the rear portion of said main frame, a hitch device having lower laterally spaced attachment means adapted to pivotally receive the forward portion of said main frame and an upper section adapted to pivotally receive the forward portion of said strut member, said hitch device including a hitch frame attachable at its forward end to a tractor in trailing relation, and crank axle means rockably connected with said hitch frame and including two laterally spaced apart generally swingable crank sections, each having a ground wheel journaled on the swinging end thereof.

9. A disk harrow comprising a main frame, disk gangs connected at their laterally inner ends to said frame, an adjustable strut member pivotally connected at its rear portion with the rear portion of said main frame, a hitch device having lower laterally spaced attachment means adapted to pivotally receive the forward portion of said main frame and an upper section adapted to pivotally receive the forward portion of said strut member, said hitch device including a hitch frame attachable at its forward end to a tractor in trailing relation, and crank axle means rockably connected with said hitch frame and including two laterally spaced apart generally swingable crank sections, each having a ground wheel journaled on the swinging end thereof.

10. A disk harrow comprising a rigid frame means, a plurality of gangs flexibly connected at their inner ends with said frame means, a hitch device pivotally connected with the forward part of said rigid frame means, generally vertically movable ground wheels disposed between said gangs, a generally transverse rigid member carried by said hitch device and disposed generally over one pair of said gangs and extending laterally outwardly of said rigid frame means, a wheel structure rockably mounted on said transverse rigid member and carrying said ground wheels, means connected with said rockable wheel structure to raise and lower the wheels relative thereto so as to lower and raise said frame means and disk gangs relative to the ground, said hitch device including an upper section, an adjustable strut member pivotally connected at its rear portion with the rear portion of said rigid frame means and at its forward portion with said upper section, and means supporting the outer ends of said gangs from said frame means when said ground wheels are lowered a distance sufficient to raise said gangs off the ground, said supporting means comprising a connection individual to each gang and connecting each gang, independently of the other gangs, with said rigid frame, said individual connections being constructed and arranged to provide for floating movement of said gangs relative to the frame when the latter is lowered and said wheels are raised.

11. A disk harrow comprising a generally fore-and-aft extending rigid frame means, pairs of front and rear gangs connected at their inner end portions with said frame means at points spaced apart in a fore-and-aft direction on the frame means for generally vertical swinging relative to the frame means, a hitch device pivotally connected with the forward part of said rigid frame means, a transverse structure carried by the forward portion of said hitch device, a swingable wheel frame including a transverse member rockably mounted on said transverse structure and crank arms fixed to the ends of said transverse member and extending downwardly and rearwardly to points between the front and rear gangs, ground wheels on said arms, said hitch device including an upper section, an adjustable strut member pivotally connected at its rear portion with said rear portion of said rigid frame means and at its forward portion with said upper section, an upstanding arm connected at its lower portion to the generally central portion of said transverse member, a ram unit operatively connected between said hitch device and the arm on said rockable transverse member for raising and lowering said wheels relative to said rigid frame means, and means supporting the outer ends of said gangs from said rigid frame means when said ground wheels are lowered a distance sufficient to raise said gangs off the ground, said supporting means comprising a connection individual to each gang and connecting each gang, independently of the other gangs, with said rigid frame means.

References Cited in the file of this patent

UNITED STATES PATENTS

| | | |
|---|---|---|
| 2,346,330 | Ratcliff | Apr. 11, 1944 |
| 2,440,550 | Martin | Apr. 27, 1948 |
| 2,469,622 | Acton | May 10, 1949 |
| 2,626,549 | Silver | Jan. 27, 1953 |
| 2,663,239 | Rapp et al. | Dec. 22, 1953 |
| 2,741,967 | Oehler et al. | Apr. 17, 1956 |